E. BURDSALL.
NUT MAKING MACHINE.
APPLICATION FILED NOV. 24, 1913.
1,203,698.
Patented Nov. 7, 1916.
13 SHEETS—SHEET 1.
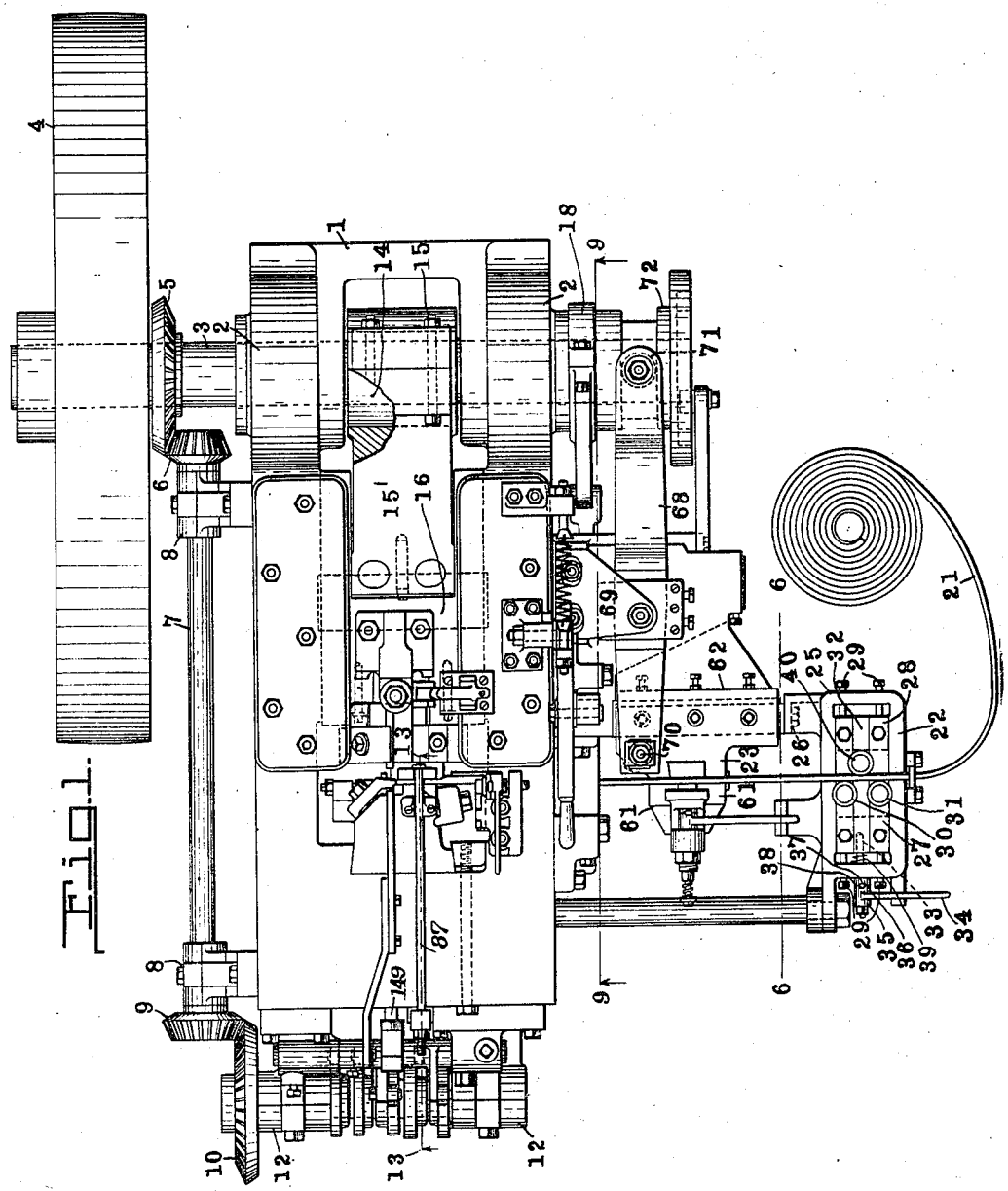
WITNESSES:
Jesse A. Holton
J. Thomson
INVENTOR
E. Burdsall
BY
Duell, Warfield & Duell
ATTORNEY

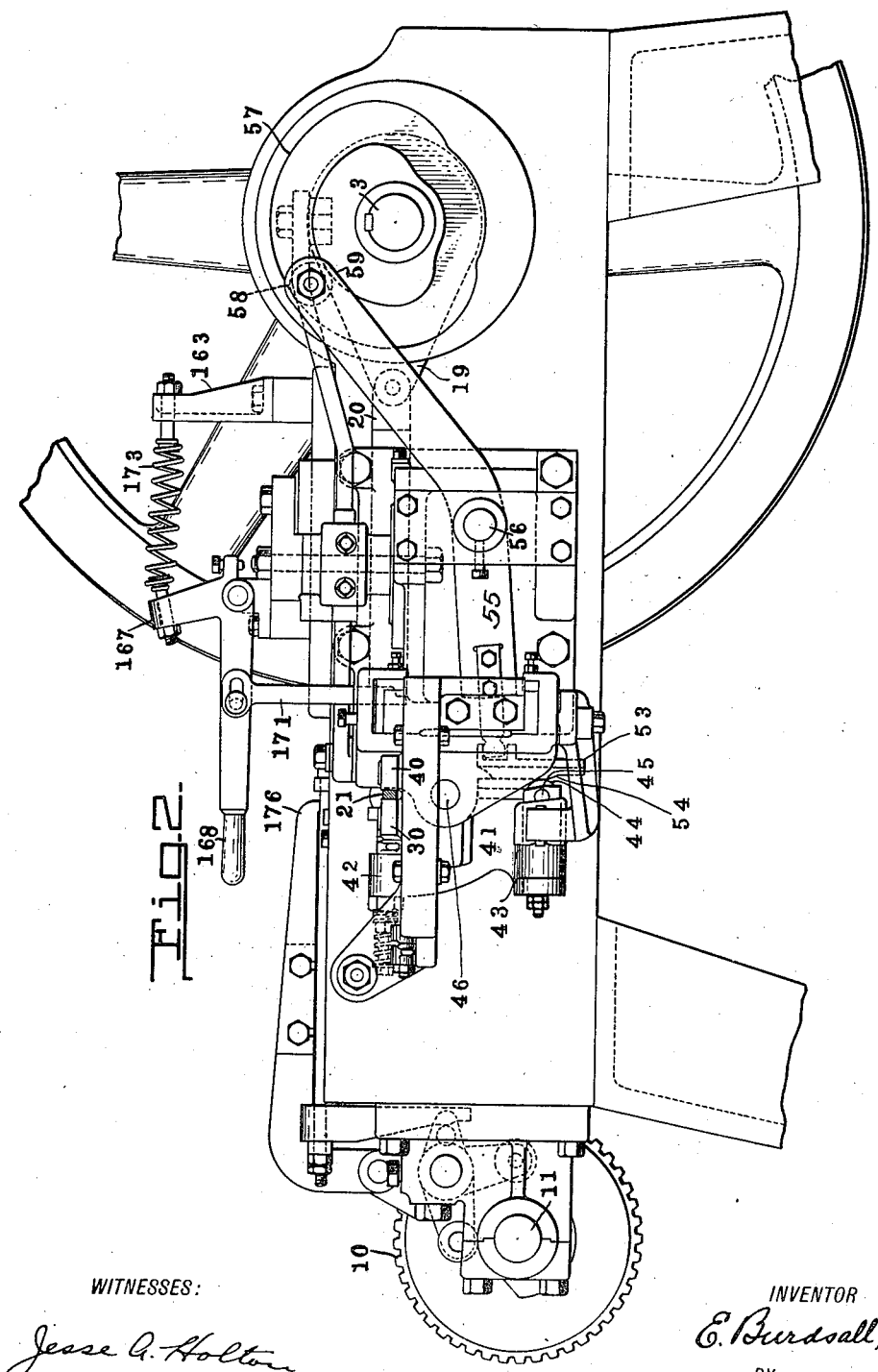

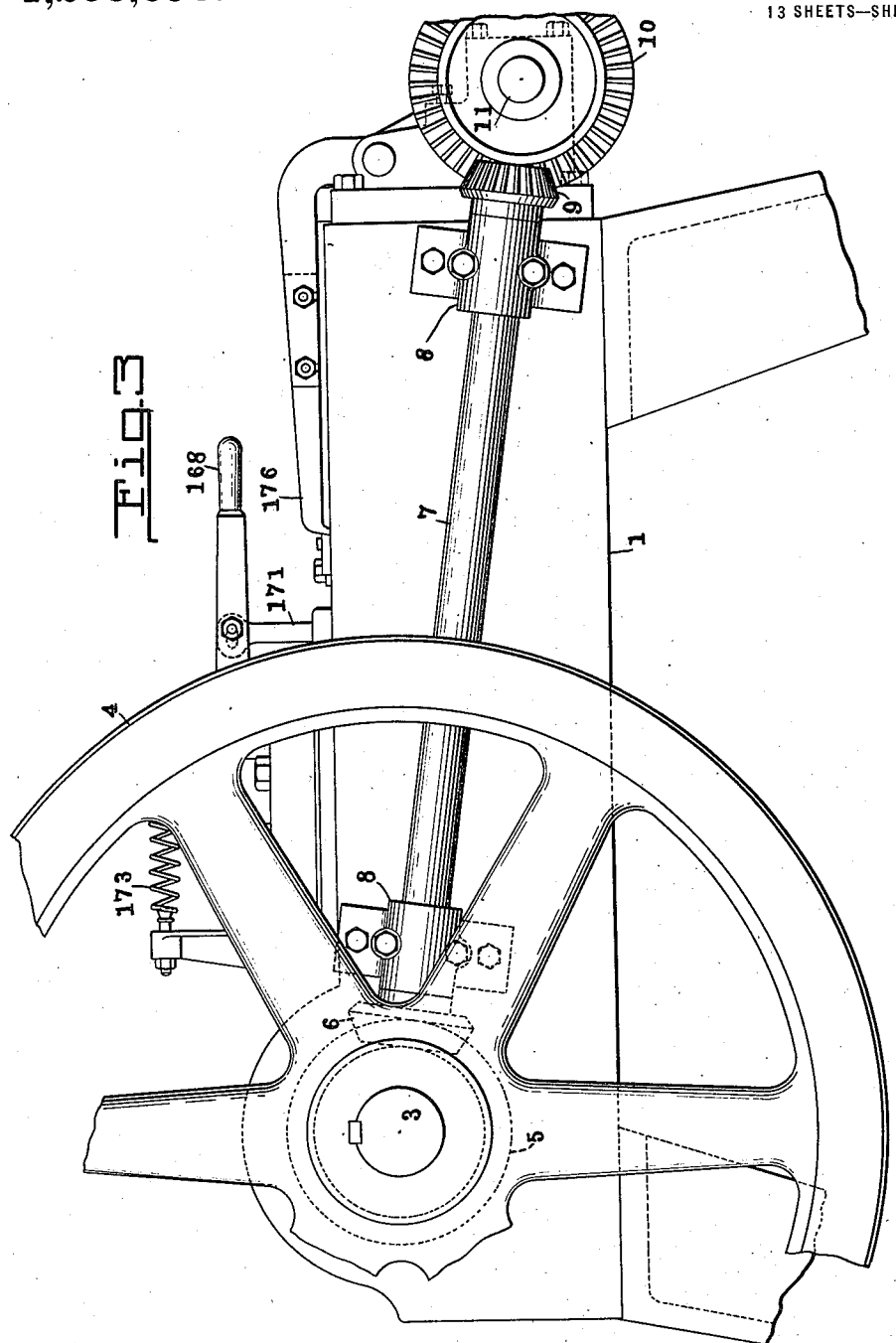

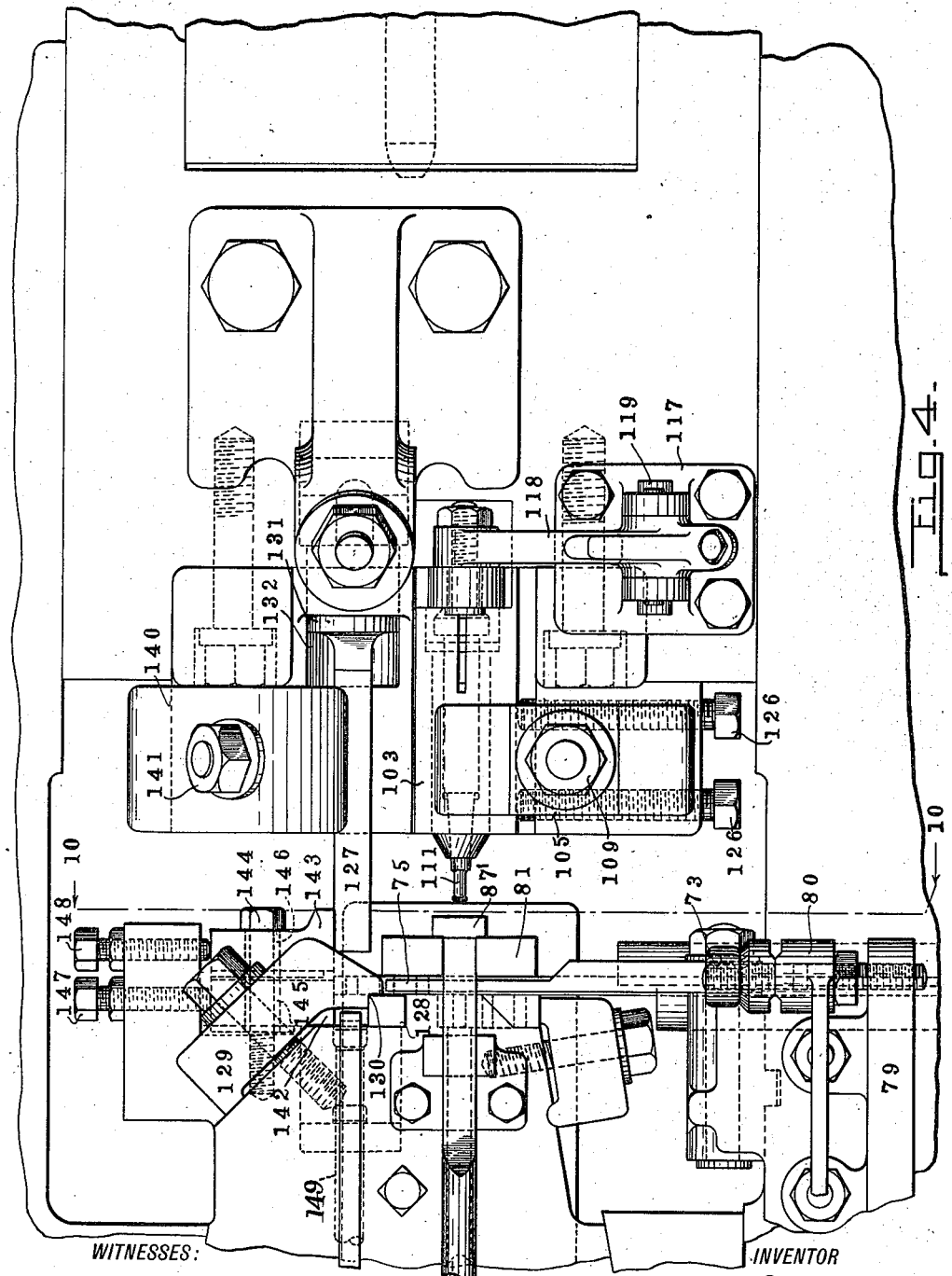

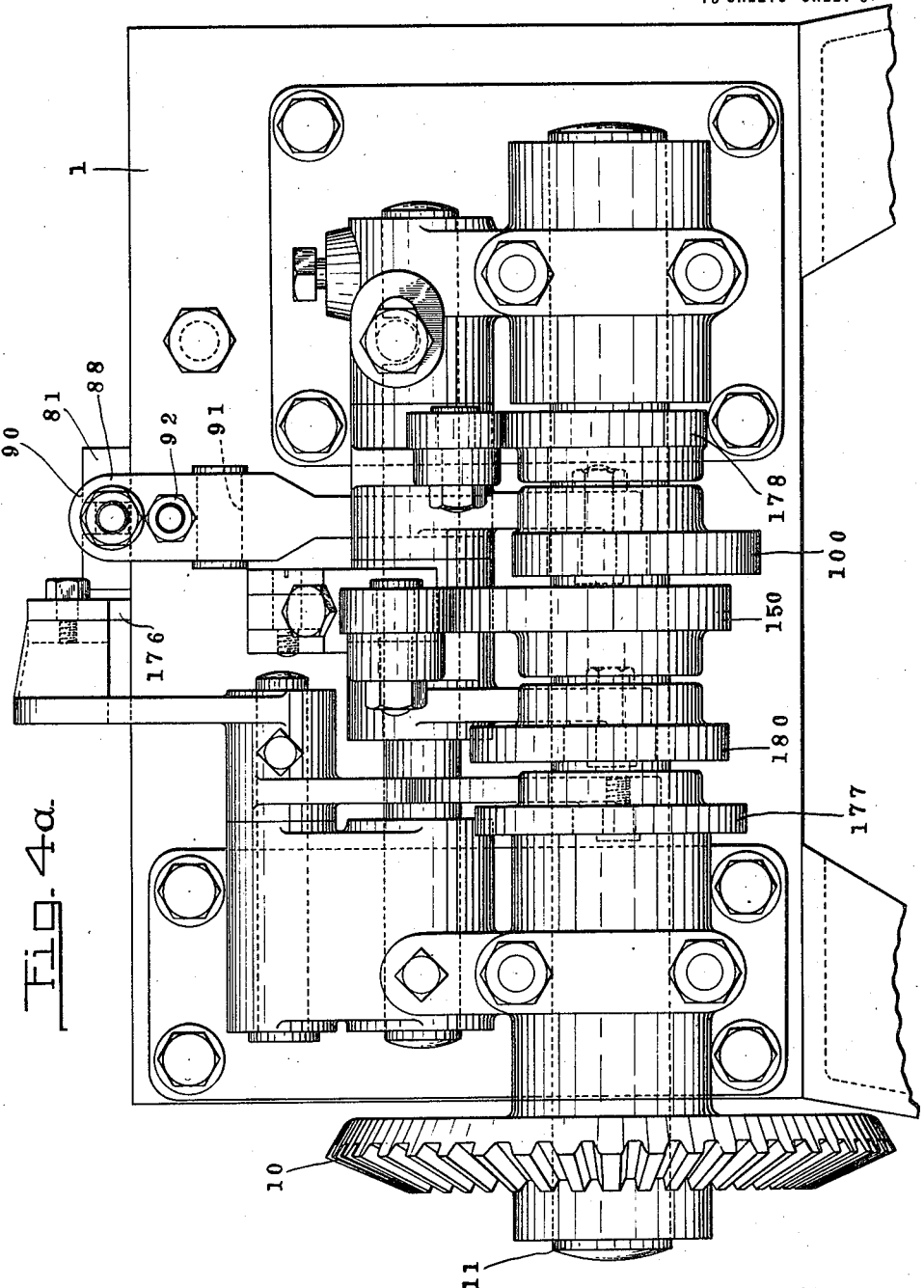

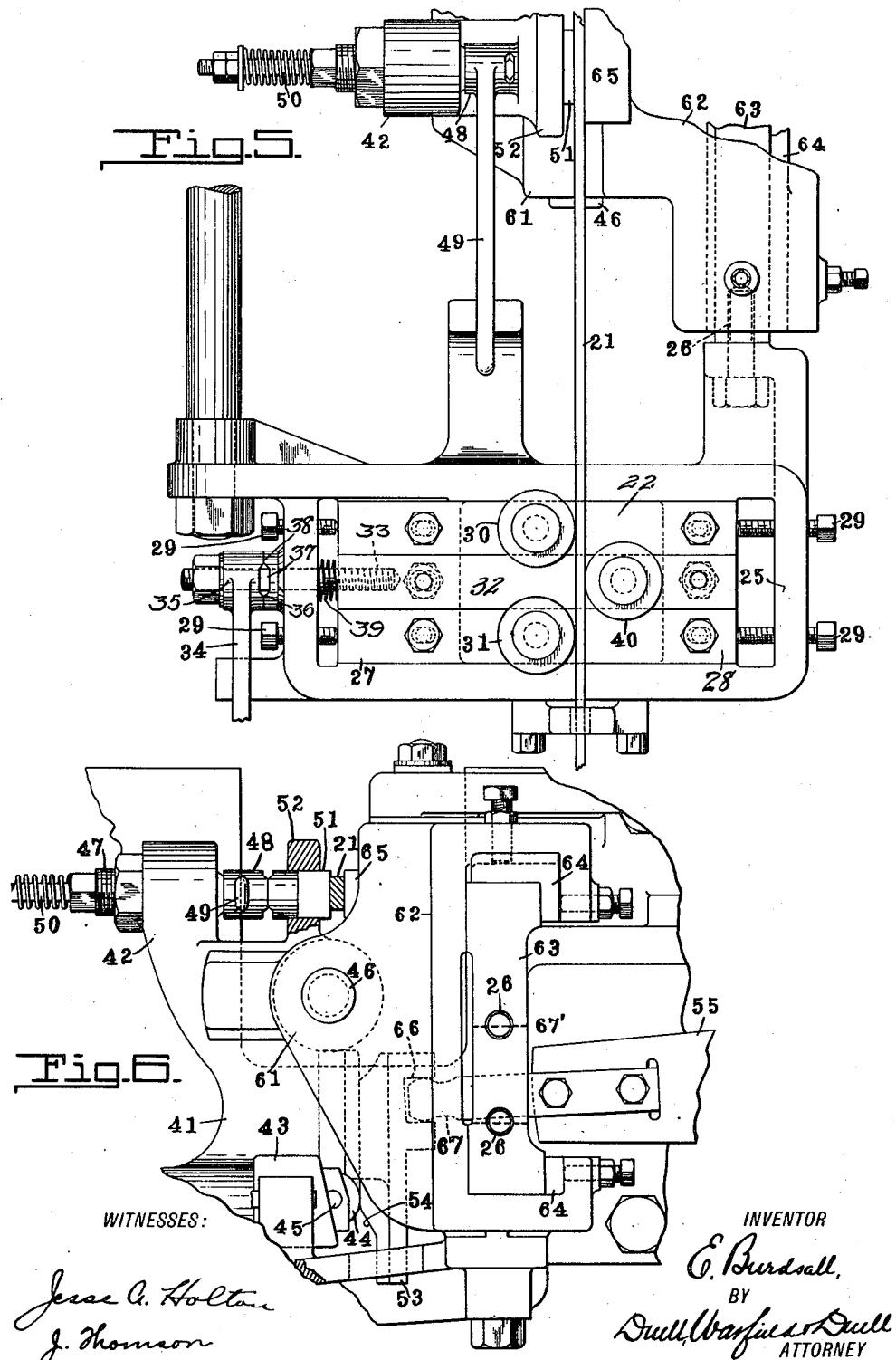

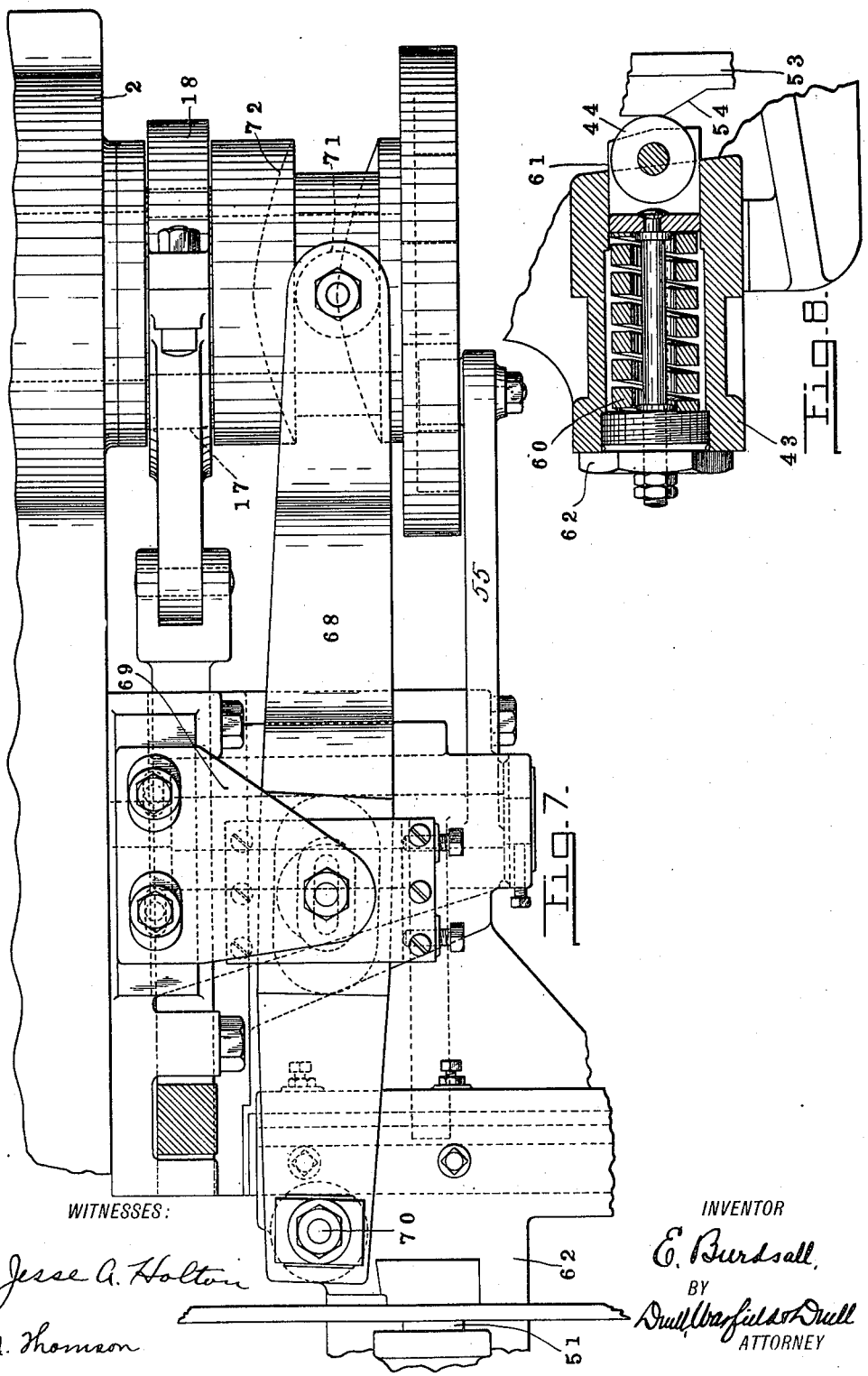

E. BURDSALL.
NUT MAKING MACHINE.
APPLICATION FILED NOV. 24, 1913.
1,203,698.
Patented Nov. 7, 1916.
13 SHEETS—SHEET 8.
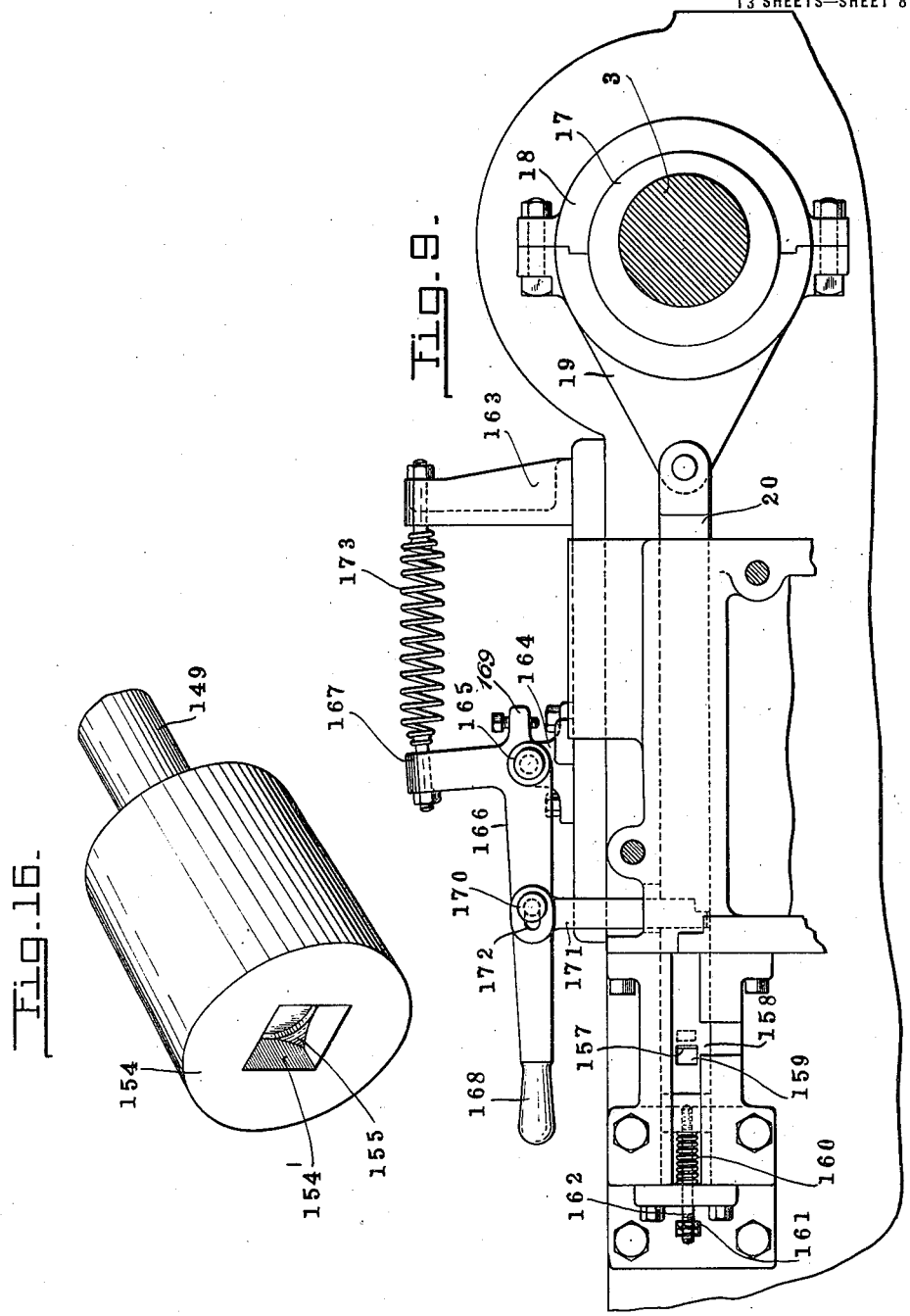
WITNESSES:
Jesse A. Holton
J. Thomson
INVENTOR
E. Burdsall,
BY
Dull, Barfield & Dull
ATTORNEY

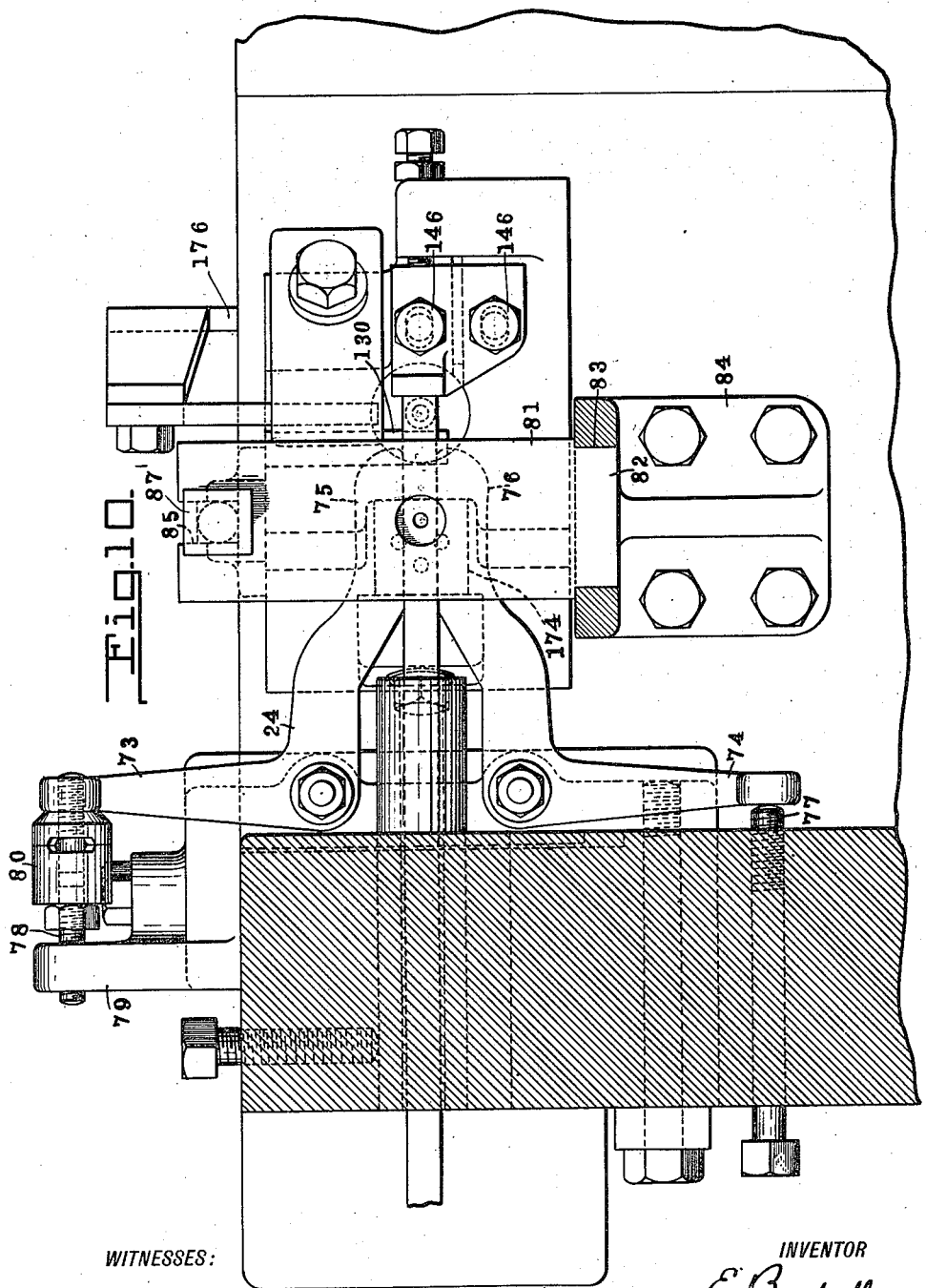

E. BURDSALL.
NUT MAKING MACHINE.
APPLICATION FILED NOV. 24, 1913.
1,203,698.
Patented Nov. 7, 1916.
13 SHEETS—SHEET 10.
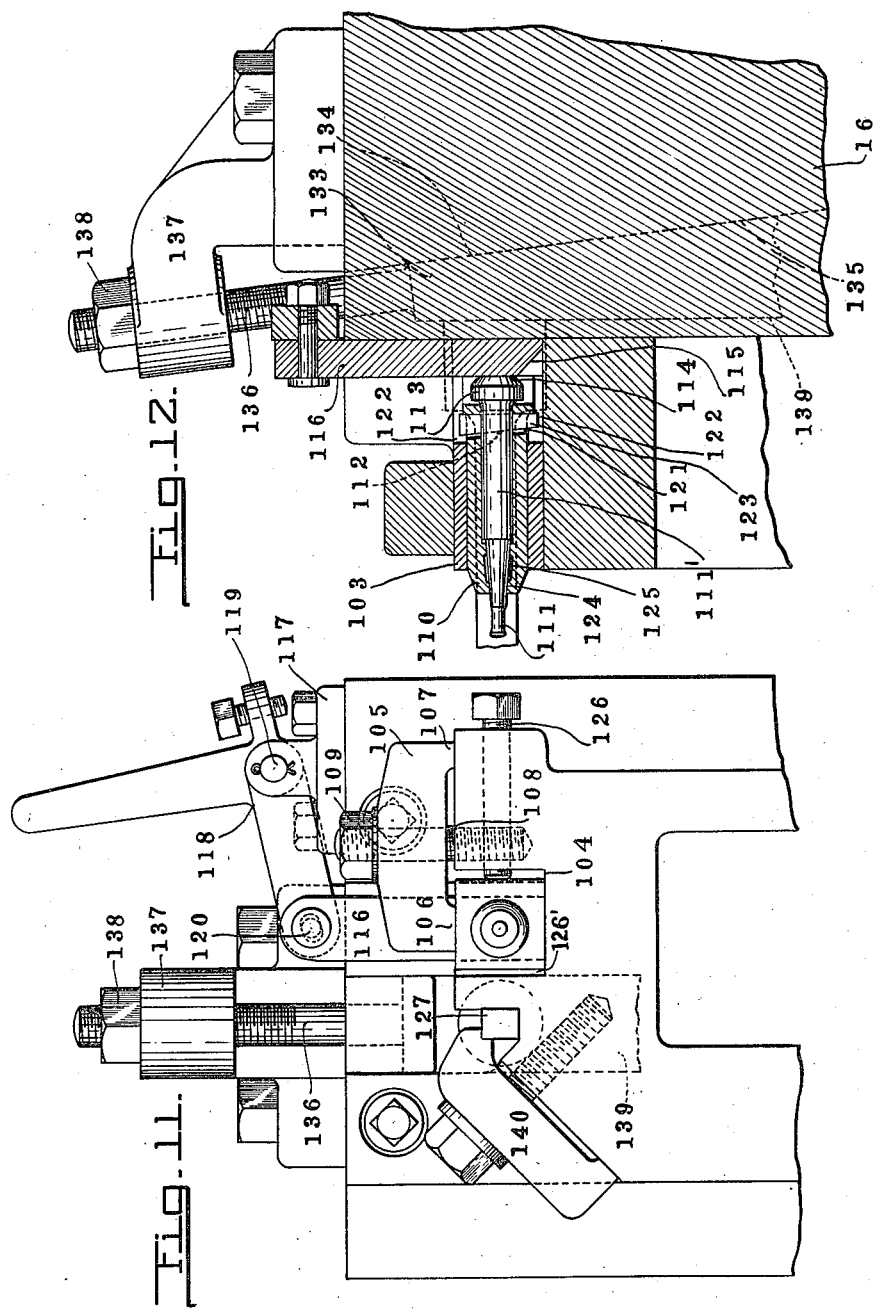
WITNESSES:
Jesse A. Holton
J. Thomson
INVENTOR
E. Burdsall
BY
Dull Barfield & Dull
ATTORNEY

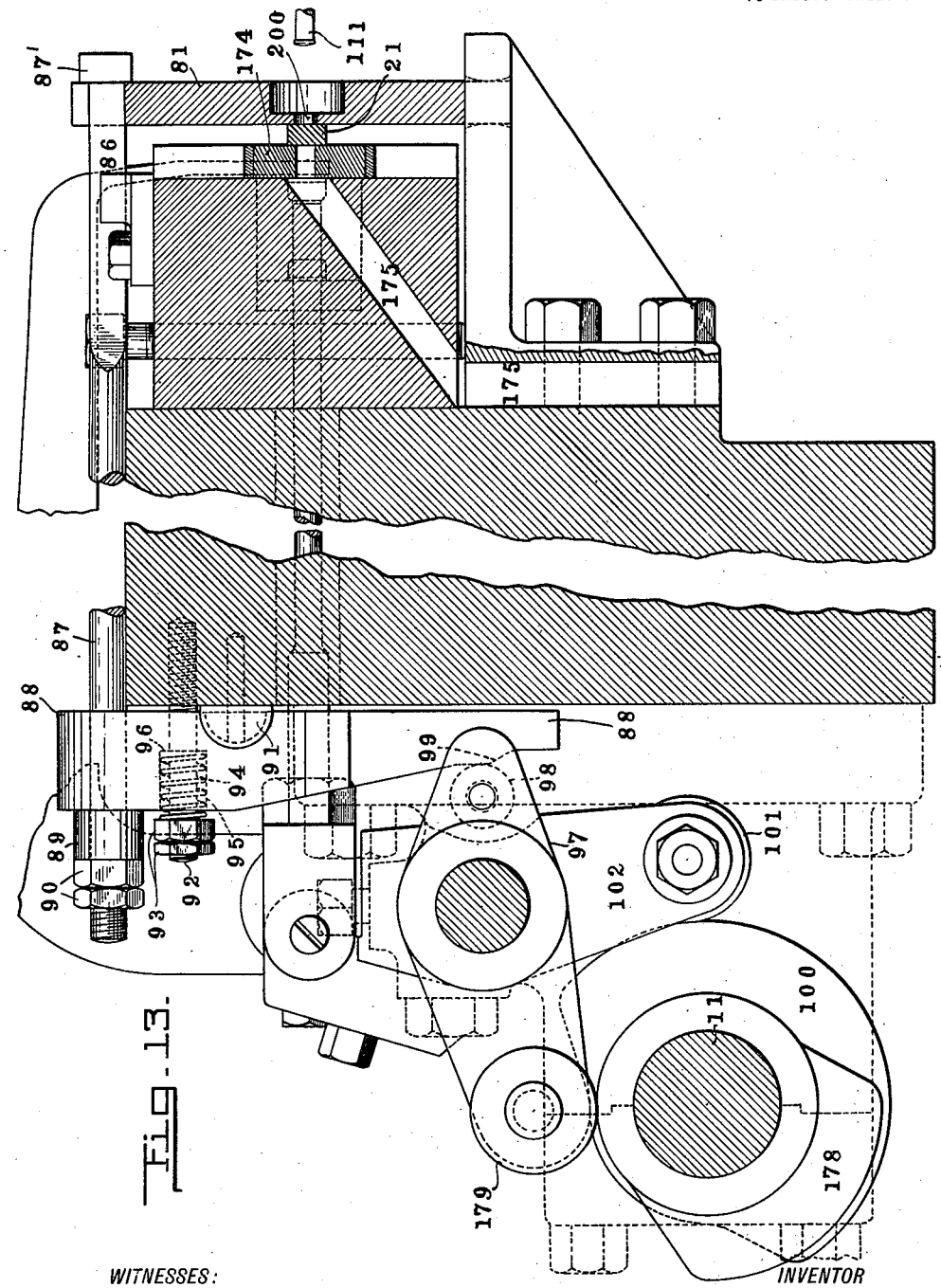

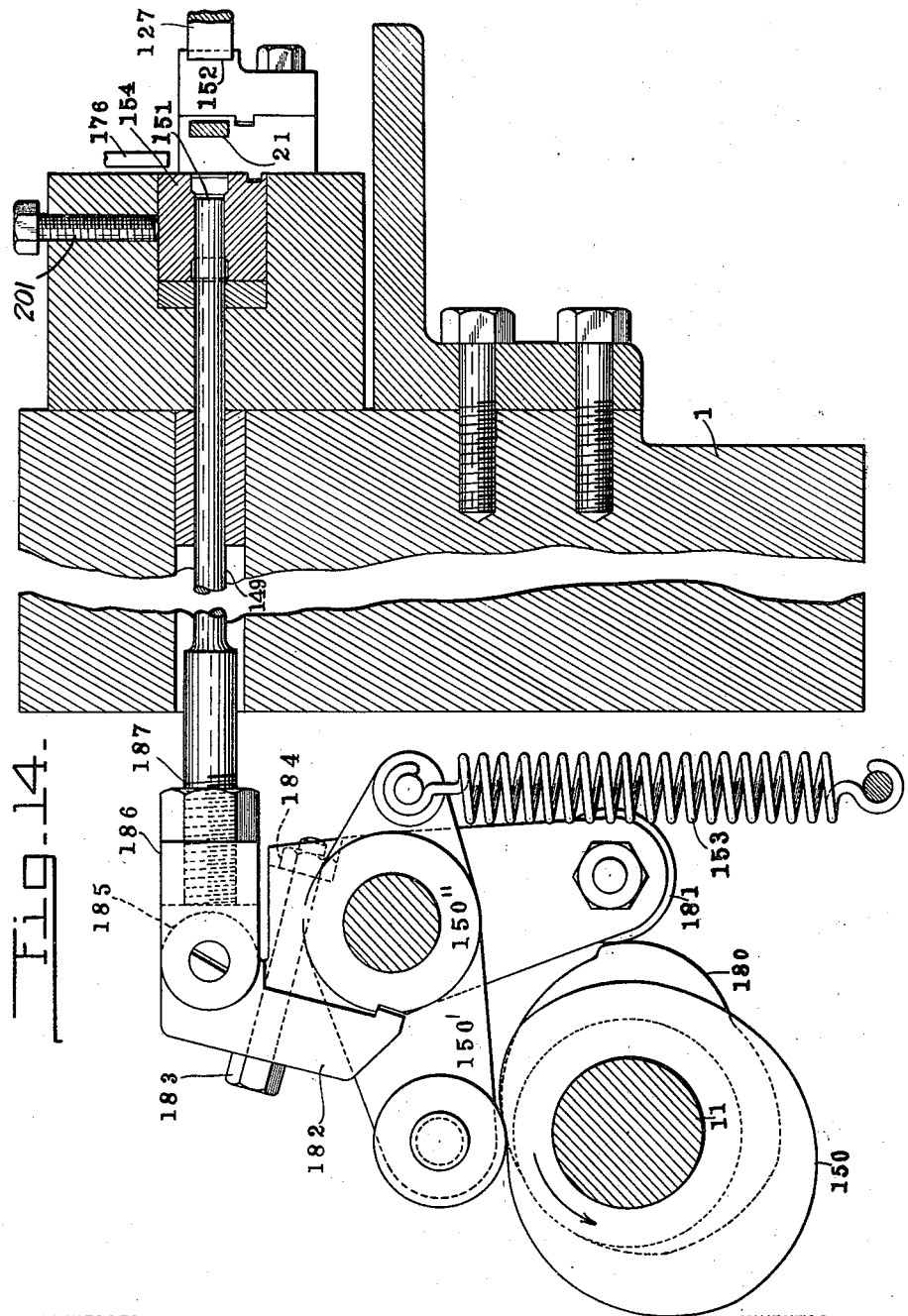

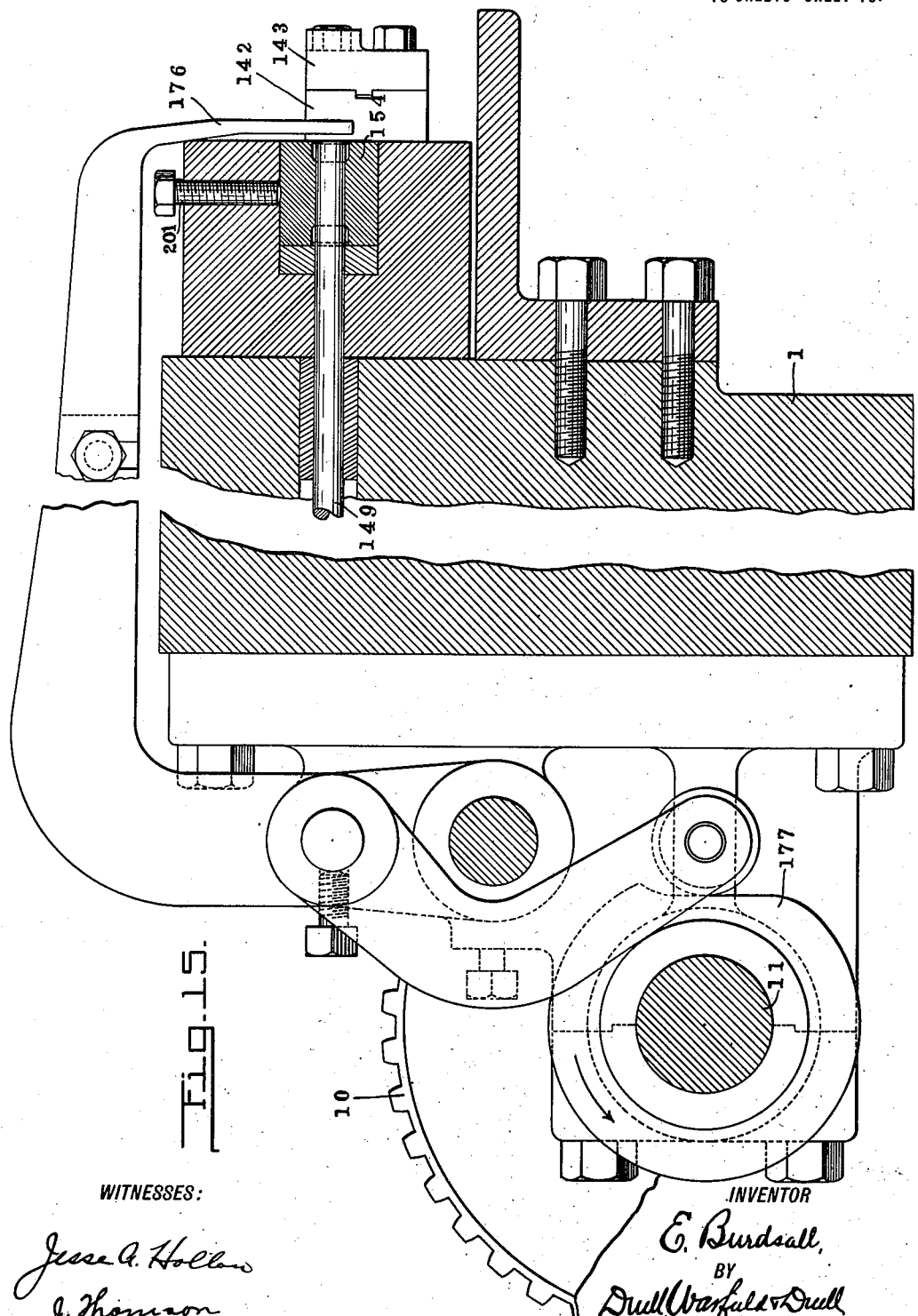

UNITED STATES PATENT OFFICE.

ELLWOOD BURDSALL, OF PORT CHESTER, NEW YORK, ASSIGNOR TO RUSSELL BURDSALL & WARD BOLT AND NUT CO., OF PORT CHESTER, NEW YORK, A CORPORATION OF NEW YORK.

NUT-MAKING MACHINE.

1,203,698.   Specification of Letters Patent.   Patented Nov. 7, 1916.

Application filed November 24, 1913. Serial No. 802,623.

*To all whom it may concern:*

Be it known that I, ELLWOOD BURDSALL, a citizen of the United States, residing at Port Chester, in the county of Westchester and State of New York, have invented certain new and useful Improvements in Nut-Making Machines, of which the following is a full, clear, and exact description, such as will enable others skilled in the art to which it appertains to make use the same.

This invention relates to metal working machines, and with regard to certain more specific features thereof to machines for the production of nuts or nut blanks from stock bars.

One of the objects of the invention is the provision of a practical automatic apparatus for the rapid production of nut blanks.

Another object of the invention is the provision of an efficient automatic apparatus for the rapid production of high grade crowned square nut blanks from "cold" stock.

Still another object of the invention is to provide a compact apparatus combining the functions of the machine in single operations thereof, as far as practicable, thereby obtaining a high degree of efficiency in point of speed.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

To promote a further understanding as to the manner in which this invention may be carried out, drawings, exemplifying a preferred embodiment of the invention have been appended as a part of this disclosure, and in such drawings like characters of reference denote corresponding parts throughout the several views of which—

Figure 1 is a plan view of a nut making machine embodying this invention, Fig. 2 is a front elevation of Fig. 1, Fig. 3 is a rear elevation of Fig. 1, Fig. 4 is an enlarged view of the reciprocating slide shown in Fig. 1 which carries the perforating punch and the shearing punch, Fig. 4$^a$ is an enlarged left end elevation of Fig. 1, Fig. 5 is an enlarged view of that portion of the machine shown in Fig. 1 which accomplishes the straightening of the stock bar, Fig. 6 is an enlarged view taken on the line 6—6 of Fig. 1, Fig. 7 is a view of the feeding mechanism for the stock bar, Fig. 8 is a sectional detailed view of a portion of Fig. 6, Fig. 9 is an enlarged view of a section of the machine taken on the line 9—9 of Fig. 1, Fig. 10 is a sectional view of the machine taken on the line 10—10 of Fig. 4, Figs. 11 and 12 are respectively an elevation of the perforating and shearing punch mechanism, and a vertical central section taken through the perforating punch, Fig. 13 is a sectional view taken on the line 13—13 of Fig. 1 showing the actuating mechanism for the clamp which holds the stock bar during the perforating operation, Fig. 14 is a central longitudinal sectional view taken through the crowning die, Fig. 15 is a view similar to Fig. 14 with certain mechanism removed to show more clearly the stripper and its actuating mechanism, and Fig. 16 is a perspective view of the crowning die showing the relative position of the plunger when the nut blank is being crowned.

Referring now more specifically to the drawings, the numeral 1 indicates a frame providing bearings 2 for a main driving shaft 3 driven by a belt on the driving pulley 4. A bevel gear 5 is fixed to the main driving shaft 3 and meshes with a bevel pinion 6 which in turn is fixed on the end of a shaft 7 supported longitudinally of the machine by bearings 8 projecting from the rear of the frame 1. On the opposite end of the shaft 7 there is fixed a bevel gear 9 meshing with a bevel gear 10 on a cam shaft 11 which is supported in bearings 12 extending from the left end of the machine. The main driving shaft 3 is provided with an eccentric member 14 which in turn is surrounded by a bearing 15 of a connecting member 15' which is in turn pivoted to a slide member 16 and in consequence of this construction the rotary movement of the shaft 3 is transposed into a reciprocating movement of the slide 16. Mounted upon the slide 16 are the two punch members which will be hereinafter described. The shaft 3 also carries an eccentric member 17 which is surrounded by a strap 18, said strap having a lug portion 19 connecting with a bar 20, the purposes of which will be hereinafter described. The numeral 21 indicates the stock bar and the same is introduced into the machine manually through the straightening device 22, the feeder 23 and the positioner 24.

The stock bar straightener comprises a frame portion 25 attached to the body of the machine at 26. The frame 25 is provided with ways 27 in which is disposed an adjustable slidable supporting member 28 positioned therein with respect to its longitudinal movement by means of screws 29 and substantially fixed relative to the frame 25 during the operation of the machine. This supporting member 28 has mounted thereon two straightening rollers 30 and 31 and has also mounted thereon a secondary slide 32. A spindle 33 is tapped into the left end of the slide 32 and has a bearing in the left end of the frame 25. On the extreme left end of the spindle 33 there is pivotally mounted an arm 34 terminating in a hub 35 which surrounds the spindle 33. This hub 35 is constructed on its inner end with diametrically opposed cam teeth 36 and projecting from the left end of the frame 25 is a boss 37 having corresponding diametrically opposed teeth 38. A spring 39 is interposed between the end of the slide 32 and the frame 25 tending to urge the secondary slide 32 in a direction toward the right of the machine. When the arm 34 is in a position permitting of the engagement of the cam teeth on the hub 35 with the cam teeth on the boss 37, in what may be termed an intermeshing relation, the spring 39 is permitted to urge the slide in a direction to carry a roller 40 away from the rollers 30 and 31, allowing suitable space for convenient introduction of the stock bar 21 between the rollers 30 and 31 on the one side and the roller 40 supported on the secondary slide 32 on the opposite side. When it is desired to overcome the action of the spring 39 and draw the roller 40 in a direction toward the other two rollers so as to dispose the several rollers in bar straightening position, the arm or handle 34 is moved into a position to bring the teeth out of their intermeshing relation and into a position where the face of one tooth abuts the face of the opposite tooth where it serves as a locking means to hold the roller 40 in its then position. This type of hand operated adjusting device is quite commonly used throughout the machine, and for convenience in expression it will be termed a "cam locking and unlocking device."

For various reasons the stock is coiled when presented to the machine and the mechanism just previously described is designed to straighten the irregularities in the stock as it unrolls from the coil. It will be seen that a three point bearing is provided, two points of which are on one side of the stock and one point of which is on the opposite side of the stock disposed centrally between the other two points in the line of feed of the stock.

The stock bar feeder consists of a gripping means in the nature of a vise and a translating means for reciprocating such vise. The gripping means comprises a rock lever 41 having an actuating end 42 and an actuated end 43 which latter carries a roller 44 pivotally mounted at 45. The rock lever 41 rocks about a pivot 46 and the actuating end 42 is equipped with a cam locking and unlocking device 47 similar to the one just previously described in connection with the straightener, except that the hub 48 carrying the arm or handle 49, which corresponds to the hub 35 carrying the arm or handle 34 in the straightener, has no relative longitudinal movement with the shaft or spindle 50. A gripper jaw 51 is provided on its left face with teeth coacting with the cam teeth on the hub 48 and this member may enjoy a relative longitudinal movement in a bearing 52 integral with the rock lever 41. A vertically reciprocating block 53 is provided with a cam portion 54 coacting with the cam roll 44 carried in the actuated end 43 of the rock lever 41. This block 53 is actuated by a rock lever 55 pivoted at 56 and in turn actuated by a face cam 57 keyed to the main driving shaft 3 in which travels a cam roll 58 carried by the extreme end 59 of the rock lever 55 (shown clearly in Fig. 2). The block 53 has accordingly an intermittent vertical reciprocatory movement and when in its lower position shown in Fig. 2 the cam roll 44 is urged to the left by means of the cam 54, and the rock lever 41 swings about the pivot 46 bringing the gripper jaw 51 into contact with the stock bar 21. The actuated end 43 of the rock lever 41 contains a heavy coil spring 60 (see Fig. 8), the same being disposed between a block 61 carrying the cam roll 44 and a threaded member 62 threaded into the extreme left end of the actuating portion 43 of the rock lever 41. It will be obvious therefore that the spring 60 is disposed, so to speak, between the block 53 and the gripper jaw 51 and the gripping is accordingly of a yielding character but sufficient to efficiently advance the stock bar under normal operation of the machine.

The before mentioned pivot 46 has bearings 61 in a slide 62, and said slide in turn has its bearings on a fixed supporting member 63, suitable Babbitt metal 64 being interposed between the slide and the supporting member in a usual manner. The supporting member 63 is in turn supported by the frame 1. The slide 62 carries a gripper jaw 65 which coacts with the gripper jaw 51 in clamping the stock bar 21 between them and it is to be noted that the entire gripping apparatus is connected to the slide 62 and movable independently of the fixed supporting member 63. The block 53 has a channel 66 extending for some distance in the direction of travel of the slide 62 and suitably constructed so that at all times it remains in engagement with a tongue 67 projecting from the rock lever 55 through an opening 67', in the member 63. The movement of the slide 62 is accomplished through the agency of a lever 68 journaled in bearings 69 on the frame and pivotally connected to the slide at 70. This lever 68 carries a cam roll 71 and is actuated by a barrel cam 72 on the main driving shaft 3. It will be seen therefore that the stock bar feeder comprises a gripping means and a reciprocating slide, the gripping jaws being adapted to coact in gripping relation during the movement of the slide toward the rear of the machine for the reason that the cam 57 has caused the block 53 to be moved into its lowermost position and to dwell there during the period of travel of the slide toward the rear of the machine which is a distance designed to be equal to the length of one nut blank. When the slide has completed its movement in the rearward direction the cams are so timed that the block 53 rises allowing the gripping jaws 51 and 65 to become separated. The stock bar 21 is consequently released and the jaws remain in open position during the return period of the slide.

The positioning means for the stock bar comprises a rock lever 73 disposed above the path of travel of the stock bar and a rock lever 74 disposed below the path of travel of the stock bar, said levers having respectively actuating ends or fingers 75 and 76 adapted when in normally operative position to contact with the stock bar for some considerable distance on the upper and lower sides thereof as it is fed. An adjusting bolt 77 is provided to control the position of the actuating end of the lever 74 and a threaded shank 78 is provided to control the position of the adjusting end of the lever 73. Interposed between the upper end of the lever 73 and a bracket 79 fixed to the frame 1 is another cam locking and unlocking device 80, this for the purpose of lifting the actuating end 75 of the lever 73 sufficiently out of the path of the stock bar to allow the latter to be conveniently passed into the machine. It will readily be seen that this may be accomplished without destroying the adjustment of the lever 73. One of the purposes of this positioning device is to present and support the stock bar centrally opposite the perforating punch and it is to be noted that minute adjustment may be obtained and that by means of the cam locking and unlocking device employed the actuating end 75 may be moved out of its operative position and back again without varying the adjustment which has previously been made. The actuating ends 75 and 76 of the levers 73 and 74 also serve to support the latter end portion of the stock after it has passed from the straightening and feeding devices.

The clamping mechanism comprises a substantially wide upstanding plate 81 having a reduced portion 82 extending downwardly into a recess 83 in a bracket 84 fixed to the main frame of the machine and also having a passageway 200 through which a perforating punch passes. The recess 83 has its longitudinal walls slightly rounded as shown in Fig. 13 in order to permit a slight pivotal movement of the plate 81 therein. This plate 81 is provided with a recess 85 in the upper portion thereof in which is loosely disposed the squared end portion 86 of a rod 87 which extends toward the left end of the machine and passes through a lever arm 88. Said rod has a head 87' which is adapted to contact with the face of plate 81. A collar 89 is provided on the rod 87 and the end of the rod is threaded to receive the nuts 90 for purposes of adjustment. Projecting from the frame 1 on this left end of the machine is a half round bearing member 91 which is adapted to act as a fulcrum for the lever arm 88. There is also projecting from the frame of the machine just above the member 91 a shank 92 threaded on its outer end to receive nuts 93 for purposes of adjustment. A spring 94 surrounds the shank 92 adjacent the inner face of the nut 93. The spring 94 extends into a recess 95 in the lever arm 88 and bears at its inner end upon a shoulder 96. This spring tends to force the upper part of the lever arm 88 toward the right of the machine and is only prevented from so doing by a rock lever 97 carrying a cam roll 98 which coacts with a cam face 99 provided on the lower end of the rock lever arm 88. A cam 100 on the cam shaft 11 coacts with a cam roll 101 carried by an arm 102 of the rock lever 97, and this cam is so timed in operation that during the perforating and shearing operations the cam roll 98 is in its upper position shown in Fig. 13, in which position the lower end of the lever arm 88 is moved toward the right of the machine about the fulcrum 91 overcoming the action of the spring 94, moving the upper end of the lever arm 88 toward the left and consequently causing the plate 81 to securely clamp the stock bar against the perforating dies. It will now be obvious that during the perforating operation of the machine the stock bar is positioned properly with respect to the punch, and is also clamped firmly against the die by means of the plate 81 and the mechanism just previously described.

*The punching mechanism.* — Of the punches provided in this machine, one may be termed, for convenience, the perforating punch, the other may be termed the shearing punch. The perforating punch is shown in Figs. 11 and 12, the numeral 103 representing a housing adapted to be clamped in a recess 104 in the reciprocating slide 16 by a clamping member 105. This clamping member has two fingers 106 and 107 adapted to rest respectively on the housing 103 and on the slide 16. Extending between these fingers through the clamping element 105 is a bolt 108 having a nut 109. When it is desired to remove the housing 103 from the machine the nut 109 is unscrewed, loosening the clamping element 105 and the same may be turned on the bolt 108 as a pivot bringing the finger 106 out of engagement with the housing 103. A cylindrical sleeve 110 is adapted to slide within the housing 103 and within this sleeve 110 is fitted a perforating punch 111. This punch is held in position in the sleeve 110 by a member 111' having a diametrical recess 112 and an enlarged head 113. The head 113 has a chamfer 114 adapted to co-act with a chamfer 115 on the lower end of a movable abutment or bar 116. In a bearing member 117 bolted to the reciprocating slide 16 there is pivotally mounted a bell crank lever 118, one arm of which serves as a handle and the other arm of which serves as a connecting link between the pivot 119 and a pin 120 which passes through the upper end of the bar 116. By this mechanism bar 116 may be thrown up and down at will and if the punch 111 has in any way been moved back toward the reciprocating slide 16 the coacting chamfers 114 and 115 respectively on the head 113 and the bar 116 will cause the punch to be moved outwardly into operative position. The cylindrical plunger 110 is also provided with a diametrical slot or key way 121, and the housing 103 has corresponding recesses 122 at the top and bottom thereof. The before mentioned recesses are for the purpose of allowing a wedge or key 123 to be passed into the housing through the plunger and through the punch for purposes of alinement and for the further purpose of driving the tapered portion 124 of the punch firmly against the seat 125 provided in the plunger 110. When the machine is in operation, perforating, shearing and crowning nut blanks, it is of course understood that the slide 16 reciprocates carrying with it the perforating punch and the shearing punch without any relative movement between the housing, the plunger and the punch. It is, however, possible, by means of the construction just described to move the reciprocating slide back and forth without perforating the stock bar as if the handle of the bell crank lever 118 is moved in a direction to lift the bar 116, the punch 111 and the plunger 110 will merely retreat into the space formerly occupied by this bar and the slide 16 may be reciprocated at will without doing any perforating. The punch 111 is also adapted for slight lateral adjustment by means of an adjusting bolt 126 bearing upon the housing 103. A filling block, or shim, 126', may be employed to coöperate in holding the punch 111 in proper relation to the shearing punch. The reciprocating slide 16 also carries a shearing punch 127 which has three prominent functions, first, to shear from the stock bar the predetermined length of a nut blank, second, to assist in carrying the sheared nut blank into the crowning die, and, third, to furnish the pressure to crown the same. A shear member, or block, 128, of tooled steel or other suitable material is adjustably secured by a clamp 129 to a die supporting block securely held in the frame, 1, and has a shearing edge 130 to coact with the shearing punch 127 to sever the stock bar. In this preferred form of the invention the shearing punch is rectangular in cross section and bears against a short cylinder 131 supported in a cylindrical recess 132 in the holder attached to the reciprocating slide 16. In and out adjustment of this shearing punch is provided for by a wedge member 133 guided by an oblique wall 134 of a recess 135 in the slide 16 and supported by a threaded shank 136 which passes through a bracket 137 and is held by a nut 138 threaded on the shank 136. The cylinder 131 of the shearing punch abuts the perpendicular face 139 of the wedge member 133 and the shearing punch 127 is secured to the punch holder attached to the reciprocating slide 16 by a clamp 140. When it is desired to adjust the position of the shearing punch 127 relative to the slide 16, the same may be accomplished by loosening the clamp 140 and turning the nut 138, thereby varying the position of the wedge 133 in a vertical direction, and simultaneously varying the position of the perpendicular face 139 of the wedge. This wedge presents a substantial backing or abutment for the shearing punch 127 and when the proper adjustment of the wedge has been made the punch 127 may be again clamped in position by tightening the nut 141. Two blocks 142 and 143 are adjustably secured by bolts 144 to the die supporting block held in the frame 1. These blocks are respectively grooved at 145 and 146 to permit of a slight degree of adjustment. Block 142 has an inner face which serves as a register or stop for the advance end face of the stock bar and block 143 has an inner face which serves as a guide for the shearing punch and also partially as a support for the same against any lateral deflection. Adjusting screws or bolts 147 and 148 bear respectively against the outer ends of the blocks 142 and 143.

In the use and operation of this machine the stock bar 21 is manually introduced through the straightening device to the feeding mechanism. This may be accomplished conveniently and is greatly expedited by the two cam devices, one of which separates the rolls of the straightening device and the other of which opens the gripper jaws. At the beginning of the operation the handles 34 and 49 of the straightener and feeder respectively are moved into the positions shown in Fig. 1, and the stock bar may be introduced farther into the machine automatically by the reciprocating slide and gripper mechanism which constitutes the feed. As the stock bar enters the positioning mechanism 24 the same is opened by means of the hand operated cam device hereinbefore described, and when the end of the stock bar has passed between the members 75 and 76 (Fig. 10), the positioning device is closed, supporting the stock bar in proper vertical relation to the perforating punch. As has been before stated, the clamping device comes into operation to securely clamp the stock bar against the perforating die just prior to the advancement of the punch to perforate. After the perforating operation, plate 81 is released from its clamping engagement with the stock bar and the latter may continue on its travel toward the shearing punch, traveling a distance equal to the length of one nut blank each feed unit. When the end of the stock bar reaches the register block 142 it is then in a position to be sheared and as the shearing punch moves to the left on its shearing stroke a plunger member 149, having the functions of a gripper, a carrier or support and an ejector, moves toward the right. This plunger member 149 is actuated positively in this direction by a cam 150, through the agency of a cam follower device comprising a cam roll carrying arm 150' of a rock lever 150''. The extreme right end or face 151 of the plunger member 149 is adapted to coöperate with the extreme left end 152 of the shearing punch to form gripper jaws to grip the stock, and effective gripping is insured by a spring 153 which tends to urge the plunger member toward the stock. The end 151 of the plunger contacts with the left side of the stock bar 21 at substantially the same time that the end 152 of the shearing punch contacts with the right side thereof and the nut blank, or that portion of the stock which lies between the register block 142 and the shearer 128 is severed and carried into a crowning die 154 by the continued movement of the shearing punch. The shearing punch has a reciprocatory movement, but the stock is sheared and the blank fed into the die and pressed against the head by a movement of this punch in one direction, being held between the end of the ejector plunger 149 and the advance end of the shearing punch during the movement into the die.

The crowning or reshaping die 154, shown clearly in Fig. 16, comprises a head or reshaping portion angularly disposed relative to the walls 154' of a chamber opposite, or coaxial with said head. The lateral walls of said chamber are rigid and very strong so as to withstand pressure tending to force them apart, and the space bounded by the lateral walls is of a size to closely fit the lateral periphery or proximate face of the blank severed from the stock bar. The head is preferably formed integral with the walls of said chamber, and comprises blank reshaping faces 155 continuous with the inner lateral walls of the chamber, and inclined toward each other, or toward the axis of said die from the inner periphery of the chamber. In the present embodiment the reshaping faces 155 are disposed one at each corner of the rectangular chamber so that when a nut blank is pressed therein, it will be crowned. The die chamber and head are preferably formed in an integral cylindrical block of hardened steel which may be removably clamped in a recess therefor in the die-supporting block opposite the path of travel of the shearing punch, a substantial screw 201 being employed to hold the die in place. The die chamber and head may be duplicated at the opposite end of the block, should the die first in use be worn or otherwise objectionable. In the head of the die is an opening or passageway communicating with the chamber of the die, and the ejector plunger 149 is adapted to move in this opening. The advancing shearing punch causes the reshaping or crowning of the blank by pressing the blank against the die head with sufficient force to cause the stock to yield, and as the walls of the chamber are rigid the pressure causes the stock to be crowded into the blank without enlarging the outside lateral dimensions of the blank, providing a nut of great strength and serviceability and one which does not require retrimming. The end of plunger 149 is held closely adjacent the head of the die, preferably slightly outside the same, being then in position to eject the crowned blank. Under a normal pressing operation practically none of the stock enters the opening at the rear of the die, but under abnormal operation, as for instance, when two blanks become simultaneously situated in the chamber, sufficient stock of the blank might be forced into the opening to contact with the plunger 149, and as the force thus operating against the plunger and the parts operating the same would be great, a safety device is provided permitting the plunger 149 to yield before sufficient pressure is attained to detrimentally affect the more delicate parts, as will hereinafter appear.

When it is desired to shear the stock bar at a point intermediate the perforating punch and the feed, as, for example, when the end of the stock bar is proceeding toward the punches, the same is accomplished by a supplementary shearing mechanism. This shearing mechanism comprises a fixed shear member 157 and a movable shear member 158, the latter constructed with an aperture 159 through which the stock bar passes. A spring 160 normally urges the shear 158 toward the right, and a nut 161 on the threaded end of a shank 162, which has its other end tapped into the shear 158, serves to limit the movement in that direction. The aperture 159 is normally disposed in the path of travel of the stock bar 21. The bar 20 has a continuous reciprocatory movement caused by its eccentric connection with the main driving shaft 3 and the left end of this bar 20 is disposed in longitudinal alinement with the movable shear member 158. The frame 1 has secured thereto a bracket 163 and a bearing bracket 164. Journaled in the bearing bracket 164 at 165 is a rock lever 166 having an arm 167, a handle 168 and a lug 169. Intermediate the handle 168 and the journal 165 there is tapped a stud 170, and on this stud hangs a depending filler 171, the purpose of which is to occupy, when desired, the space between the left end of the bar 20 and the right end of the movable shear member 158. A slot 172 is provided in the upper end of the filler permitting a slight degree of longitudinal travel of the filler 171. When the filler is in its lowermost position, as shown in Fig. 9 of the drawings, the bar 20, the filler 171 and the movable shear member 158 move as though they were integral, the movement of the shear member to the left being caused by the eccentric, and the movement to the right being caused by the spring 160. It will be obvious from the foregoing description that when the shear member 158 is moved to the left the stock is cut, and after the cutting the handle 168 may be released and a contractile spring 173 which extends from the bracket 163 to the arm 167 will cause the filler 171 to be withdrawn from its engagement with the bar 20 and the shear member 158. The bar 20 may then go on reciprocating indefinitely without causing any movement of the shear member. One of the objects of the mechanism just referred to is to cut the stock bar a predetermined distance from the punches, this distance being an exact multiple of the length of a nut blank. After the shearing operation a new stock bar is introduced into the machine abutting the severed end of the first bar, which is at that time supported by the positioner 24, and the feed of the second bar is imparted to the first. This insures the presentation of sufficient stock opposite the perforating punch at proper times, and also provides for utilizing practically the entire stock bar and turning the same into finished nut blanks of proper dimensions. The perforating die is shown at 174 removably secured to the frame and a channel 175 is provided in the frame to guide the waste stock from the machine.

After the nut blank has been reshaped, or crowned, in the manner hereinbefore described, the plunger 149 is again urged toward the right of the machine by the cam 150 this movement being comprised in a succession of steps. This movement continues until the end 151 of the plunger is substantially flush with the outer face of the crowning die, this being one step of the movement and while it is in this position for a certain angular travel of the cam 150 a deflector, or "knockout" 176 descends rapidly and strikes and deflects the finished nut blank from its path of ejection, whence it falls out of the machine. This deflector 176 (see Fig. 15) is operated by a cam 177 on the cam shaft 11, and is so timed that it descends at the instant just previously mentioned and then quickly rises out of the path of the plunger 149 which then proceeds in a direction toward the right of the machine on its next step until it again contacts with the stock bar at about the time the shearing punch contacts with the opposite side of the stock bar. The cam 100 which operates the clamping mechanism and co-acts with the cam roll 101 has a complement cam 178 which co-acts with the cam roll 179 giving a positive movement to the rock lever 97 in the opposite direction, and in the same way the cam shaft 11 carries a second cam 180 which co-acts with a second cam follower device comprising the cam roll 181 to provide a positive return of the plunger 149 in the event that no stock is in the machine at the time. There is, however, a condition of floating of the cam rolls of the rock lever 150″ with respect to the cams 150 and 180 during a certain angular travel of said cams. This is for the purpose of allowing the spring 153 full control of the plunger 149 in urging the same toward the stock and insures a substantial yielding restraint and continuing pressure against said stock as the same is being carried into the die. It will be obvious that when there is stock disposed between the shearing punch and the plunger the former causes the latter to retreat before it, directly pressing it through the intervening blank, and the plunger is accordingly returned into the die. During this retreat the cam rolls "float" with respect to the cams 150 and 180 but only slightly away therefrom so that if no stock is in position to be gripped between the punch and the plunger the cam 180, being suitably constructed and timed, operates to cause a positive return of the plunger, thereby bringing it out of the path of the stripper or knockout 176.

The connection between the plunger member 149 and the rock lever 150'' is purposely designed to be frangible and the same comprises a connecting member 182 secured to the upper portion of the rock lever 150'' by a slender bolt 183 and a nut 184. This connecting member has a tongue 185 pivotally engaging the bifurcated portion of a forked collar 186 adjustable on the plunger 149 as indicated at 187. If in any way the plunger should be subjected to severe pressure tending to urge it beyond the limits provided for by the engagement of the cam 150 with the coöperating cam roll on the rock lever 150'' the bolt 183 is designed to break or strip the threads of the nut 184 thereby breaking the connection between the plunger and its somewhat delicate actuating mechanism and protecting these more expensive and less conveniently replaced parts of the machine.

The feed of the stock bar may be varied by varying the position of the fulcrum of the rock lever 68. It will be noted that the bearings 69 are adapted for adjustment on the frame 1.

By the above described construction is produced a machine capable of rapidly automatically producing finished nut blanks from a metallic stock bar. The stock employed may be of any character usually employed in nut machines, but is preferably of low carbon steel, and the stock is preferably fed into the machine "cold." The crowning or reshaping die is so located relatively to the path of the shearing punch and the ejector as to avoid complexity of construction and provide for simple movements of the parts. The shearing punch moves in alinement with the reshaping die, being designed to coöperate by its plane advance end to grip the sheared blank, move the same toward the reshaping head, and press the same thereagainst, movement of said shearing punch in one direction being sufficient to accomplish these several functions. The ejector also participates in the feed of the blank into the reshaping die, moving at the same time and in the same direction, and part of its ejecting movement is also utilized to advance it into position for gripping a succeeding blank. In this manner these parts are disposed to afford as little idle motion as possible consistent with efficient operation. The movement of the perforating punch is accomplished by the mechanism which moves the shearing punch, at the same time, and in the same direction, so that no relative loss of time occurs in the operation of these punches. A single movement in one direction of the punch carrying head is all that is required to produce a blank and reshape or crown the same, and repetition of this movement in coöperation with the bar feeding, centering and clamping devices, etc., results in the production of an automatic machine capable of accomplishing in a practical and highly efficient manner the objects hereinbefore referred to.

Having described my invention, what I claim as new and desire to secure by Letters Patent is:

1. In an apparatus of the character described, in combination, a die comprising a reshaping head and a chamber coaxial with said head, and means adapted to move a blank into and out of said chamber to cause reshaping thereof, said means comprising a blank gripper movable toward and from said die and adapted to hold the blank as the same is being moved.

2. In an apparatus of the character described, in combination, a die comprising a reshaping head and a chamber coaxial with said head, means adapted to move a bar of stock into position opposite said chamber, and means adapted to sever a blank from said bar and carry the same under pressure into said chamber and against said reshaping head, said means comprising a blank gripper adapted to hold the blank as the same is being carried.

3. In an apparatus of the character described, in combination, a die comprising a reshaping head and a chamber coaxial with said head, said head having an opening communicating with said chamber, means adapted to move a bar of stock into position opposite said chamber, a reciprocatory gripper jaw adapted to operate through said opening, and a reciprocatory punch adapted on movement in one direction to sever a blank from said bar and press said blank against said head thereby reshaping the blank, said punch providing a gripping jaw adapted to coöperate with said first-mentioned jaw to move said blank into said chamber on said movement in one direction.

4. In an apparatus of the character described, in combination, a die comprising a reshaping head and a chamber coaxial with said head, said head having an opening communicating with said chamber, means adapted to move a bar of stock into position opposite said chamber, a reciprocatory combined ejector and gripper jaw adapted to operate through said opening, and a reciprocatory combined punch and gripper jaw adapted on movement in one direction to sever a blank from said bar, coöperate with the combined ejector and gripper jaw to move said blank into said chamber, and press said blank while in said chamber, said combined ejector and gripper being adapted to thereafter move said blank from said chamber.

5. In an apparatus of the character described, in combination, a die comprising a reshaping head and a chamber coaxial with said head, means adapted to move a bar of stock into position opposite said chamber, a reciprocatory member, a punch carried by said member, a sleeve through which said punch passes, means adapted to fix said punch to said sleeve, an abutment on said member against which said perforating punch and said sleeve bear during punching, and manual means adapted to move said abutment into and out of position to be engaged by said sleeve and said punch.

6. In an apparatus of the character described, in combination, a die comprising a reshaping head and a chamber coaxial with said head, means adapted to move a bar of stock into position opposite said chamber, a reciprocatory member, a punch carried by said member, a sleeve through which said punch passes, means adapted to fix said punch to said sleeve, an abutment on said member against which said perforating punch and said sleeve bear during punching, manual means adapted to move said abutment into and out of position to be engaged by said sleeve and said punch, and a reciprocatory shearing punch adapted on movement in one direction to sever a perforated blank from said bar and press said blank against said head thereby reshaping said blank.

7. In an apparatus of the character described, in combination, a die comprising a reshaping head and a chamber coaxial with said head, means adapted to move a bar of stock into position opposite said head, means adapted to sever successive blanks from said stock and press them one by one against said head, and means adapted to shear the remote end of said bar at a point to provide a length of bar which is a multiple of the length of a severed blank.

8. In an apparatus of the character described, in combination, a die comprising a reshaping head and a chamber coaxial with said head, means adapted to move a bar of stock into position opposite said head, means adapted to sever successive blanks from said stock and press them one by one against said head, and means adapted to shear the remote end of said bar at a point to provide a length of bar which is a multiple of the length of a severed blank, comprising a bar-shearing implement, and means adapted at will to throw said implement into and out of operative connection with the continuously operating portion of the machine.

9. In an apparatus of the character described, in combination, a die comprising a reshaping head and a chamber coaxial with said head, means adapted to move a bar of stock into position opposite said head, means adapted to sever successive blanks from said stock and press them one by one against said head, means adapted to shear the remote end of said bar at a point to provide a length of bar which is a multiple of the length of a severed blank, comprising a reciprocatory rod having a passageway therethrough for said bar of stock, a reciprocatory element operatively connected to the driving mechanism of the machine, and means adapted to be interposed at will between said reciprocatory rod and said element to communicate the movement of said reciprocatory element to said rod.

10. In an apparatus of the character described, in combination, a die comprising a reshaping head and a chamber coaxial with said head, said chamber having rigid lateral walls, a reciprocatory device adapted to yieldingly grip said bar and move the same into position opposite said head, a perforating die and a coöperative punch positioned, respectively, on opposite sides of the path of said bar, a shearing punch movable with said perforating punch and in line with said chamber into and out of said chamber, mechanism adapted to reciprocate said punches, a combined blank ejector and gripper movable between the walls of said chamber, and means adapted to cause said combined ejector and gripper to coöperate with said shearing punch to grip a severed blank and move the blank into said chamber.

11. In an apparatus of the character described, in combination, a die comprising a reshaping head and a chamber coaxial with said head, said chamber having rigid lateral walls, a reciprocatory device adapted to yieldingly grip said bar and move the same into position opposite said head, a perforating die and a coöperative punch positioned, respectively, on opposite sides of the path of said bar, a shearing punch movable with said perforating punch and in line with said chamber into and out of said chamber, mechanism adapted to reciprocate said punches, a combined blank ejector and gripper movable between the walls of said chamber, and means adapted to cause said combined ejector and gripper to coöperate with said shearing punch to grip a severed blank and move the blank into said chamber and eject said blank from said chamber.

12. In an apparatus of the character described, in combination, a die comprising a reshaping head and a chamber coaxial with said head, said head having a passageway leading to said chamber, means adapted to press a blank against said head and thereby reshape the same, a movable ejector operating in said passageway adapted to push the reshaped blank from said chamber, means adapted to hold said ejector adjacent said head during a normal pressing operation on said blank, and means adapted to permit said ejector to yield under abnormal pressing operation.

13. In an apparatus of the character described, in combination, a die comprising a reshaping head and a chamber coaxial with said head, said head having a passageway leading to said chamber, means adapted to press a blank against said head and thereby reshape the same and tending to force material of the blank into said passageway, a movable ejector operating in said passageway adapted to push the reshaped blank from said chamber, means adapted to normally hold said ejector in position to be pressed by material of said blank when forced into said passageway, and means adapted to permit said ejector to yield under abnormal pressure of said material thereagainst.

14. In an apparatus of the character described, in combination, a die comprising a reshaping head and a chamber coaxial with said head, said head having a passageway leading to said chamber, means adapted to press a blank against said head and thereby reshape the same, an ejector plunger movable in said passageway, means adapted to reciprocate said plunger in said passageway and chamber comprising a cam, said cam being designed to stationarily position the ejector face of the plunger adjacent the reshaping head at a predetermined time, and a frangible connection interposed in the operative connection between said cam and ejector face.

15. In an apparatus of the character described, in combination, a die comprising rigid lateral walls adapted to closely fit the lateral faces of a blank in position in said die, said die comprising a reshaping head, a stock shearing element, and means adapted to grip a blank severed from the stock and move the same into said die.

16. In an apparatus of the character described, in combination, a die comprising rigid lateral walls adapted to closely fit the lateral faces of a blank in position in said die, said die comprising a reshaping head, a stock shearing element, and means adapted to yieldingly grip a blank severed from the stock and move the same into said die.

17. In an apparatus of the character described, in combination, a die comprising rigid lateral walls adapted to closely fit the lateral faces of a blank in position in said die, said die comprising a reshaping head, and stock gripping means comprising a reciprocatory punch and a coöperative plunger, and means whereby said gripping means is moved in one direction, to shear a blank from the stock and move the severed blank into said die, said punch operating to press said blank against said head, said head having an opening in which said plunger moves.

18. In an apparatus of the character described, in combination, a die comprising rigid lateral walls adapted to closely fit the lateral faces of a blank in position in said die, said die comprising a reshaping head, stock gripping means comprising a reciprocatory punch and a coöperative plunger, means whereby said gripping means is moved in one direction, to shear a blank from the stock and move the severed blank into said die, said punch operating to press said blank against said head, said head having an opening in which said plunger moves, and means adapted to dispose the gripping face of said plunger away from the severed blank during a normal pressing of said blank against said head.

19. In an apparatus of the character described, in combination, a die comprising rigid lateral walls adapted to closely fit the lateral faces of a blank in position in said die, said die comprising a reshaping head, a stock shearing element, means adapted to support a blank severed from the stock and move the same into said die, means adapted to automatically feed a stock bar into position to be sheared, a stop against which the advance end face of the stock bar is moved by said feeding means, and means adapted, at will, to sever the stock bar between said shearing element and the rear end of said bar, so as to leave a length of stock bar in the machine which is a multiple of the length of the blank sheared from said bar.

20. In an apparatus of the character described, in combination, a die comprising rigid lateral walls adapted to closely fit the lateral faces of a blank in position in said die, said die comprising a reshaping head, a stock shearing element, means adapted to grip a blank severed from the stock and move the same into said die comprising a reciprocatory punch and a coöperative plunger adapted, on movement in one direction, to shear a blank from the stock and move the severed blank into said die, said punch operating to press said blank against said head to reshape said blank, and means whereby said plunger is moved into coöperative blank gripping relation to said punch between successive reshaping operations.

21. In an apparatus of the character described, in combination, a die comprising rigid lateral walls adapted to closely fit the lateral faces of a blank in position in said die, said die comprising a reshaping head, a stock shearing element, means adapted to grip a blank severed from the stock and move the same into said die comprising a reciprocatory punch and a coöperative plunger adapted, on movement in one direction, to shear a blank from the stock and move the severed blank into said die, said punch operating to press said blank against said head to reshape said blank, said head having an opening in which said plunger moves, and means whereby the gripping face of said plunger is moved out of said die into coöperative blank gripping relation to said punch between successive reshaping operations.

22. In an apparatus of the character described, in combination, a die comprising rigid lateral walls adapted to closely fit the lateral faces of a blank in position in said die, said die comprising a reshaping head, a stock shearing element, means adapted to grip a blank severed from the stock and move the same into said die comprising a reciprocatory punch and a coöperative plunger adapted, on movement in one direction, to shear a blank from the stock and move the severed blank into said die, said punch operating to press said blank against said head to reshape said blank, said head having an opening in which said plunger moves, means whereby the gripping face of said plunger is moved in successive steps out of said die toward said punch, thereby moving the blank from said die and causing said plunger to assume coöperative blank gripping relation to said punch, a deflector, and means adapted to move said deflector into contact with the reshaped blank between said successive movements of said plunger.

23. In an apparatus of the character described, in combination, a die comprising rigid lateral walls adapted to closely fit the lateral faces of a blank in position in said die, said die comprising a reshaping head, a reciprocatory punch, a reciprocatory plunger, means whereby said punch, on movement in one direction, shears a blank from stock and coöperates with said plunger to grip the severed blank and move the same into said die, and means adapted to yieldingly restrain said last mentioned movement of said blank and plunger.

24. In an apparatus of the character described, in combination, a die comprising rigid lateral walls adapted to closely fit the lateral faces of a blank in position in said die, said die comprising a reshaping head, a reciprocatory punch, a reciprocatory plunger, means whereby said punch, on movement in one direction, shears a blank from stock and coöperates with said plunger to grip the severed blank and move the same into said die, means adapted to yieldingly restrain said last mentioned movement of said blank and plunger, and means adapted to positively effect movement of said plunger in said last mentioned direction.

25. In an apparatus of the character described, in combination, a die comprising rigid lateral walls adapted to closely fit the lateral faces of a blank in position in said die, said die comprising a reshaping head, a reciprocatory punch, a reciprocatory plunger, means whereby said punch, on movement in one direction, shears a blank from stock and coöperates with said plunger to grip the severed blank and move the same into said die, and means adapted to yieldingly press said plunger toward said punch during said last mentioned movement.

26. In an apparatus of the character described, in combination, a die comprising rigid lateral walls adapted to closely fit the lateral faces of a blank in position in said die, said die comprising a reshaping head, a reciprocatory punch, a reciprocatory plunger, means whereby said punch, on movement in one direction, shears a blank from stock and coöperates with said plunger to grip the severed blank and move the same into said die, and means adapted to positively effect movement of said plunger in said last mentioned direction.

27. In an apparatus of the character described, in combination, a die comprising rigid lateral walls adapted to closely fit the lateral faces of a blank in position in said die, said die comprising a reshaping head, means adapted to shear a blank from stock and move the severed blank in a direction to enter said die, comprising a reciprocatory plunger mounted to move in said die, means adapted to effect the reciprocation of said plunger comprising a cam, a cam follower device operatively connected to said plunger, and a spring adapted to urge said follower device out of contact with said cam.

28. In an apparatus of the character described, in combination, a die comprising rigid lateral walls adapted to closely fit the lateral faces of a blank in position in said die, said die comprising a reshaping head, means adapted to shear a blank from stock and move the severed blank in a direction to enter said die comprising a shearing punch, a reciprocatory plunger mounted to move in said die, means adapted to effect the reciprocation of said plunger comprising a cam, a cam follower operatively connected to said plunger, said cam adapted to coöperate with said follower to move said plunger toward the stock to be sheared, a second cam, a second cam follower operatively connected to said plunger, said second cam and second follower adapted to coöperate to positively move said plunger away from the path of the stock to be sheared, and spring means adapted to hold said followers out of contact with their respective cams when said plunger is directly pressed toward said die by said shearing punch.

29. In an apparatus of the character described, in combination, a die comprising a reshaping head, a shearing punch, the advance end of which comprises a gripper jaw, said punch being adapted to reciprocate into and out of said die and toward and from said head, means adapted to automatically feed stock, a stop in the path of said stock adapted to dispose the advance end of said stock in alinement with the opening in said die, a plunger adapted to reciprocate toward and from said punch in alinement with said die, the advance end of which comprises a gripper jaw, and means whereby the above mentioned elements are coöperatively associated to separate said gripper jaws, move stock into position between said jaws, cause said shearing punch to sever a blank from said stock, cause said punch and said plunger to convey the severed blank to said die, and said punch to press said blank against the head of said die.

30. In an apparatus of the character described, in combination, a die comprising rigid lateral walls adapted to closely fit the lateral faces of a blank in position in said die, said die comprising a reshaping head, a shearing punch adapted to reciprocate in a substantially horizontal plane toward and from said head and to enter and leave said die, means adapted to automatically feed a stock bar into position between said die and said punch when the latter is out of said die, means adapted to move said punch toward said die to shear a blank from the stock, and press the severed blank against said head, and means adapted to coöperate with said punch to support said blank until it is received within said die.

In testimony whereof I affix my signature, in the presence of two witnesses.

ELLWOOD BURDSALL.

Witnesses:
R. H. BURDSALL,
W. S. COMLY.